United States Patent [19]

Brandt

[11] Patent Number: 5,033,498
[45] Date of Patent: Jul. 23, 1991

[54] VALVE FOR INFLATED ARTICLE

[75] Inventor: David E. Brandt, Linn, Mo.

[73] Assignee: The Schlueter Company, Linn, Mo.

[21] Appl. No.: 534,943

[22] Filed: Jun. 8, 1990

[51] Int. Cl.$^5$ .............................................. F16K 15/20
[52] U.S. Cl. ................................................ 137/223
[58] Field of Search ........................................ 137/223

[56] References Cited

U.S. PATENT DOCUMENTS

| 2,073,766 | 3/1937 | Suzuki | 137/223 X |
| 2,183,900 | 12/1939 | Voit et al. | 137/223 |
| 2,295,804 | 9/1942 | Olson | 273/65 |
| 2,302,985 | 11/1942 | Voit et al. | 154/16 |
| 2,318,115 | 5/1943 | Tubbs | 273/65 |
| 2,387,433 | 10/1945 | Fenton | 137/223 X |
| 2,387,455 | 10/1945 | McDermott | 137/223 X |
| 2,600,862 | 6/1952 | Fenton | 137/223 X |
| 2,760,775 | 8/1956 | Tipton | 273/58 |
| 2,934,344 | 4/1960 | Chupa | 273/58 |
| 3,100,498 | 8/1963 | Gibson, Jr. | 137/223 |
| 3,100,641 | 8/1963 | Nicholls et al. | 273/65 |
| 3,107,683 | 10/1963 | Ochoa | 137/223 |
| 3,174,501 | 3/1965 | DeSee et al. | 137/223 |
| 3,204,959 | 9/1965 | Nicholls | 273/58 |
| 3,220,729 | 11/1965 | Whittington | 273/58 |
| 4,341,382 | 7/1982 | Arnold | 273/65 |
| 4,660,831 | 4/1987 | Kralik | 273/65 |

Primary Examiner—John Rivell
Attorney, Agent, or Firm—Cohn, Powell & Hind

[57] ABSTRACT

This valve (20) for a molded inflatable article (10) includes a valve housing (22) unitarily formed with the article (10) and having a cylindrical valve chamber (32). The valve parts assembled within the valve housing (20) include a self-sealing plug 40 and at least an upper retaining ring (44) holding the pressurized plug (40) in place within the valve chamber (32). The plug (40) can be apertured to receive an inflating needle and be oversized for diametrical compression into the valve chamber (32) to facilitate sealing.

5 Claims, 1 Drawing Sheet

U.S. Patent      July 23, 1991      5,033,498
FIG. 1.
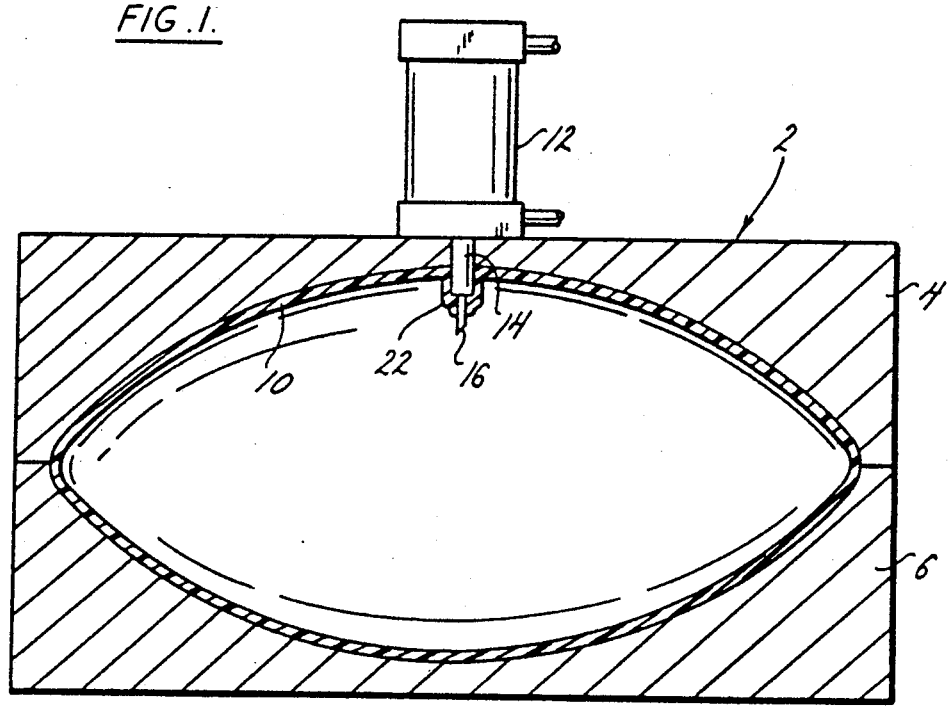
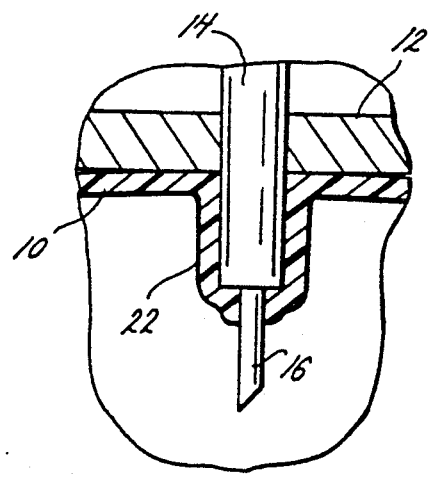
FIG. 2.
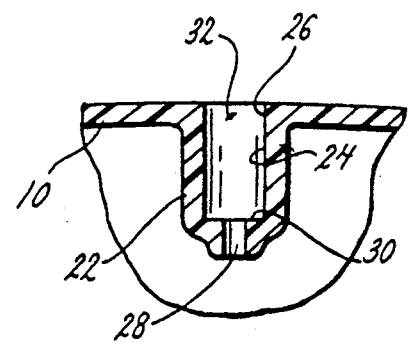
FIG. 3.
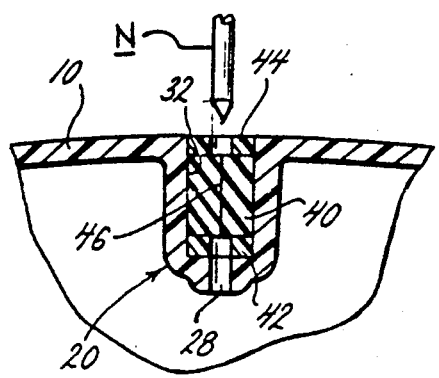
FIG. 5.
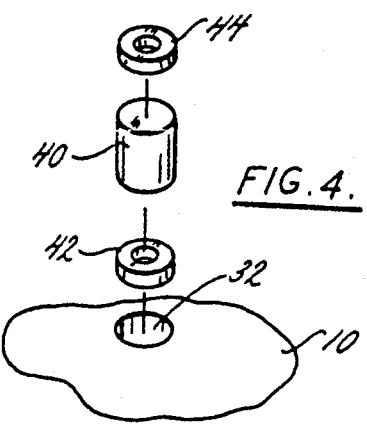
FIG. 4.

VALVE FOR INFLATED ARTICLE

BACKGROUND OF THE INVENTION

This invention relates generally to valves for molded inflatable articles, particularly to valves which accept an inflating needle, and to the method of forming the valve during the molding process.

There are several types of valves known for inflating articles such as balls, toys, tubes and similar articles. One type, represented by U.S. Pat. Nos. 3,107,683 and 4,341,382 utilizes metal valve parts inserted after the inflated article is formed. Another type, represented by U.S. Pat. Nos. 3,100,641, 3,204,959 and 3,220,729, utilizes metal or plastic parts which are placed in the mold prior to forming the inflated article. This valve is in the form of a tube or sleeve including a side aperture which pushes out or displaces the stem when pumping begins. Another type, more pertinent to this invention, is represented by U.S. Pat. Nos. 2,295,804, 2,302,985, 2,318,115, 2,387,455, 2,600,862, 2,760,775, 2,934,344, 3,174,501 and 4,660,831. These patents relate to inflatable articles in which the valves are self-sealing after withdrawal of an inflating needle. The valve chamber either contains a soft, sticky, puncture-sealing composition or a plug with a passage in the form of a slit which is effectively sealed by air pressure on the outside of the walls of the chamber which holds it. Inflation, thus, closes the plug opening. In each instance the plug is forced into the chamber by compressing it, so that it can be held in the chamber by some overlapping element such as a shoulder, a rib, a flange or a groove. The disadvantage of such an arrangement is that the pressure required to insert the plug, equals the pressure bringing about its removal. The use of a bonding agent for the plug is not totally satisfactory because it limits valve replacement.

The invention herein overcomes these disadvantages in a manner not disclosed in the known prior art.

SUMMARY OF THE INVENTION

This invention provides an improved valve which is adapted to accept a needle for inflating balls used in sports, and other inflatable articles. Such valves generally are flexible valves of the self-sealing type forced beneath flanges and rims molded in the inflatable article. The valve herein is distinguished in that it includes a valve chamber, an upper retaining ring and a self-sealing plug. The valve chamber is in the form of a smooth hollow cylinder unitarily formed with the inflatable article wall. The cylinder, thus, is devoid of prior art plug retaining rims and flanges. The plug is in the form of a semisolid self-sealing cylinder sized to be compressed into the cylindrical valve chamber. A lower ring is provided having a needle-accepting orifice therein, and an area sufficient not only to restrain the plug but to decrease air pressure on the lower drum surface. The upper retaining ring is secured in the chamber above the plug to prevent outward movement of the plug from the chamber. The plug includes a longitudinal passage which is self-sealing because of the induced compression in the plug.

The method of forming the valve includes spin welding the upper retaining ring in place and forming a passage in the plug by piercing the compressed plug after assembly of the valve parts.

BRIEF DESCRIPTION OF THE DRAWINGS

For a better understanding of the fabrication of the valve of this invention reference is made to the accompanying drawings;

FIG. 1. is a cross section showing the molding apparatus;

FIG. 2. is an enlarged cross section of the valve mold;

FIG. 3. is a cross section showing the valve housing;

FIG. 4. is an exploded view of the valve elements, and

FIG. 5. is a cross sectional view of an assembled valve.

DESCRIPTION OF THE PREFERRED EMBODIMENT

As the prior art discussed illustrates, inflatable balls and similar articles are well known. Hence their fabrication need not be discussed at length herein. They are generally fabricated from such polymers and copolymers as vinyl plastisols like polyvinyl chloride, polyvinyl chloride-acetate copolymers and copolymers of vinyl acetate and ethylene. Other polymers can also be used such as the polyurethanes, polyethylene, and polypropylene. The inflatable objects are usually fabricated using slush molding, blow molding, or injection molding techniques. A very popular method has been to enclose the vinyl plastisol in a mold which is rotated about a plurality of axes to line the mold and form the object. The rotational step is carried out in the presence of controlled heat which progressively raises the temperature of the contained polymer t a point which, on subsequent cooling, enables the material to form the article.

Referring now by reference numerals to the drawings and first to FIG. 1, it will be understood that a mold 2 is shown within which an article 10 is to be blow molded. The mold is in two sections 4 and 6, separable so that the molded article 10 can be removed. As shown in FIG. 1 an air cylinder 12 with a retractable end 14 introduces air into the mold and the plastic layer expands until it fills the mold becoming, on cooling, the skin of the article 10, such as an inflatable ball.

In the fabrication of inflatable objects of the type contemplated herein a male member is incorporated into the mold interior to form a valve housing. In the past this member has been shaped to form a valve chamber with flanges, ridges, ledges or grooves to hold the internal valve parts in place. See, for example, U.S. Pat. No. 2,295,804.

In the present mold, the retractable end 14 of the air cylinder 12 including the needle tip 16 is used to form the housing of valve 20. The valve housing 22 is unitarily formed with the skin of the ball 10 and, as shown in FIG. 4, when the retractable end 14 is removed a valve housing is provided having a smooth cylindrical inner wall face 24. At its upper end the valve housing 22 includes an opening 26 of the same diameter as the cylindrical face 24 and at its lower end includes a opening 30 of a smaller diameter than the wall face 24 to define an abutment 30 resulting from the reduced diameter of the needle 16. The wall face and the abutment cooperate to define a valve chamber 32 devoid of ledges and flanges and configured to receive the valve parts completing the valve 20. Thus, in lieu of a special member the valve housing 22 is formed around the retractable end and needle of the blow mold apparatus itself.

The interior parts of the valve 20 include a cylindrical plug 40 and retaining rings 42 and 44 as clearly shown in FIGS. 4 and 5. The plug 40 is the self-sealing portion of the valve 20 and can be a puncture-sealing composition such as unvulcanized natural rubber, uncured, or some other partially cured gel or elastomeric material. Alternatively, and as shown in FIGS. 4 and 5 the plug 40 can be provided with a small diameter longitudinally extending central passage 46. When a perforated plug of this type is used the plug 40 must be sized larger in diameter than the valve chamber inner wall face so that when the plug is compressed by insertion into the valve chamber the pressure from the wall face is sufficient to seal the passage 46. As will be readily understood the provision of a central passage 46 facilitates the insertion of the inflating needle (not shown) and closes automatically to seal the valve when the needle is withdrawn In the preferred embodiment the passage 46 is formed after the valve has been assembled.

As shown by reference to FIGS. 4 and 5 the valve 20 is assembled by inserting the lower retaining ring 42 into the valve chamber 32 until it engages the abutment 30. Next, the cylindrical plug 40 is diametrically compressed and inserted into the valve chamber 32 until it engages the lower retaining ring 42. Finally, the upper retaining ring 44 is inserted until it engages the plug 40. The rings and plug are sized so that when the assembly is complete the upper retaining ring 44 is substantially flush with the outer skin of the ball 10. When the ball 10 is inflated for example with a pressure of ten to twenty pounds per square inch (10–20 p.s.i.) it will be understood that considerable pressure is exerted on the plug 40 and the upper ring 44 tending to force them out of the valve chamber 32. In order to resist this pressure, the upper ring 44 is firmly secured to the upper portion of the valve chamber 32. While this can be accomplished by adhesive material, it has been found that a superior attachment is made by making the ring of the same or compatible material as the skin of the inflated article so that the ring may be fuse-welded, or spin-welded, to the material of the inner face of the valve chamber 32. For this purpose the upper ring 44 is made slightly larger than the diameter of the valve chamber 32. The ring 44 and the ball 10 are relatively rotated to generate sufficient frictional heat so that they fuse together as the ring is pressed into place in the valve chamber. The thickness of the ring 44 is such that when it is flush with the outer surface of the ball 10 an additional compressive force is exerted on the plug 40.

The opening of the lower ring 42 in the embodiment shown is substantially the same size as the opening defining the abutment 30. By providing a lower ring having an opening considerably smaller than the diameter of the plug 40 the pressure on the bottom of the plug is reduced. In the embodiment shown the upper and lower rings are similar but the lower ring 42 is slightly smaller in diameter than the valve chamber 32 so that it can be easily pushed into place within the chamber.

As noted above, in the preferred embodiment the passage 46 is formed after the assembly of the plug 40 and rings 42 and 44 is completed. This is accomplished by providing that the openings in the coaxial rings 42 and 44 are slightly larger, about 0.075 inches, than a pointed needle N, of the same diameter as a conventional inflating needle, about 0.070 inches, which is inserted into the compressed plug 40, using the ring openings for a guide to form the passage 46. When the needle N is withdrawn the passage 46 self-seals because of the diametrical compression in the plug 40. The passage 46 thus formed facilitates insertion of the inflating needle (not shown).

In the embodiment shown sufficient compression is provided in the plug 40 using a plug having an initial length of 0.3125 inches and an initial diameter of 0.3125 inches with a valve chamber of 0.28 inches diameter. For a valve chamber of this diameter an upper ring having an initial diameter of 0.3125 and a thickness of 0.090 inches has been found suitable for the spin-welding process. The lower ring 42 is the same thickness but slightly less in diameter than the valve chamber.

As indicated hereinbefore any of the various elastomeric resins can be employed in the fabrication of inflatable articles, the particular resin usually depending upon the article being fabricated. In the embodiment shown, the material from which the inflatable article is formed is a synthetic thermoplastic resin, generally known as TPE's (thermoplastic elastomers) and TPU's (thermoplastic urethanes). An example of such material is LOMOD resin, registered trademark of General Electric Company but the material will depend to some extent on the purpose for which the inflated article is to be used. Material such as LOMOD resin has been found suitable for the production of balls used, for example, in the game American football.

Likewise, the rings can be fabricated either of metal or of a hard plastic material or, as discussed, can be formed of the same material as the skin of the inflated article. In addition, various other means for securing the upper ring 44 in the valve chamber will occur to those in the field. Similarly plug element 40 is subject to a wide latitude of materials, natural rubber or urethane being used for the preferred embodiment. These modifications will be apparent to those working with inflatable plastics. Such ramifications are deemed to be within the scope of this invention.

Accordingly, it will be understood that various aspects and features of the invention are achieved and other advantageous results are attained. While preferred embodiments of the invention have been shown and described, it will be clear to those skilled in the art that various modifications may be made without departing from the invention in its broader aspect.

I claim as my invention:

1. A valve for an inflatable article, the valve being adapted to accept an inflating needle and comprising:
    (a) a valve housing having a wall unitarily formed with the inflated article and defining a valve chamber in the form of a hollow cylinder with an upper end having an opening of a diameter at least as great as the diameter of the cylinder, and a lower end having an opening communicating with the interior of the article,
    (b) a cylindrical plug of a self-sealing material, and
    (c) an upper retaining ring adapted to be secured in the cylindrical chamber above the plug and adapted to hold the cylindrical plug in the cylindrical chamber.

2. A valve as defined in claim 1, in which the opening at the lower end of the valve chamber has a diameter less than the valve chamber to define an abutment.

3. A valve as defined in claim 2 in which:
    (d) a lower retaining ring is disposed in the chamber between the plug and the abutment.

4. A valve as defined in claim 1 in which:
    (d) the cylindrical plug includes a longitudinal passage and is of an initial diameter larger than the diameter of the valve chamber so that on compression to the diameter of the valve chamber the passage is self-sealing.

5. A valve as defined in claim 1, in which:
(d) the upper retaining ring is of substantially the same material as the article both being elastomers and is fused to the valve chamber wall.

* * * * *